United States Patent
Jurik et al.

(10) Patent No.: US 7,172,217 B2
(45) Date of Patent: Feb. 6, 2007

(54) ENERGY ABSORPTION SYSTEM FOR A STEERING COLUMN BRACKET

(75) Inventors: Mirjana Jurik, Rochester Hills, MI (US); Jeffrey D Ottenhoff, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 429 days.

(21) Appl. No.: 10/769,407

(22) Filed: Jan. 30, 2004

(65) Prior Publication Data

US 2005/0167964 A1   Aug. 4, 2005

(51) Int. Cl.
*B62D 1/18* (2006.01)
(52) U.S. Cl. ...................................... 280/777
(58) Field of Classification Search ................ 280/777; 188/371–374
See application file for complete search history.

(56) References Cited

U.S. PATENT DOCUMENTS

| | | | |
|---|---|---|---|
| 3,177,540 A | 4/1965 | Hall et al. | |
| 3,230,592 A | 1/1966 | Hosea | |
| 3,485,133 A | 12/1969 | Rapata | |
| 3,745,612 A | 7/1973 | Seckerson | |
| 4,630,716 A * | 12/1986 | Faust | 188/371 |
| 4,988,308 A | 1/1991 | Toedtman | |
| 5,024,118 A | 6/1991 | Khalifa et al. | |
| 5,390,955 A | 2/1995 | Kaliszewski et al. | |
| 5,573,362 A | 11/1996 | Asami et al. | |
| 5,605,073 A | 2/1997 | Milton et al. | |
| 5,609,364 A * | 3/1997 | Fouquet et al. | 280/777 |
| 5,609,423 A | 3/1997 | Jurik et al. | |
| 5,704,642 A | 1/1998 | Jurik et al. | |
| 5,755,461 A | 5/1998 | Halacka et al. | |
| 5,797,685 A | 8/1998 | Jurik et al. | |
| 5,960,673 A | 10/1999 | Eaton et al. | |
| 5,979,860 A | 11/1999 | Jurik et al. | |
| 6,234,528 B1 * | 5/2001 | Ben-Rhouma et al. | 280/777 |
| 6,578,872 B2 * | 6/2003 | Duval et al. | 280/777 |
| 6,592,148 B2 * | 7/2003 | Byers et al. | 280/777 |
| 6,655,716 B2 * | 12/2003 | Riefe | 280/777 |
| 6,659,504 B2 * | 12/2003 | Riefe et al. | 280/777 |
| 6,749,221 B2 * | 6/2004 | Li | 280/777 |
| 6,749,222 B2 * | 6/2004 | Manwaring et al. | 280/777 |
| 6,769,715 B2 * | 8/2004 | Riefe et al. | 280/777 |
| 6,811,185 B2 * | 11/2004 | Bohlen et al. | 280/777 |
| 6,814,373 B2 * | 11/2004 | Munro et al. | 280/777 |
| 6,854,765 B2 * | 2/2005 | Heinzman et al. | 280/776 |
| 6,942,250 B2 * | 9/2005 | Dubay et al. | 280/777 |

* cited by examiner

*Primary Examiner*—Paul N. Dickson
*Assistant Examiner*—Laura B. Rosenberg
(74) *Attorney, Agent, or Firm*—Ralph E. Smith

(57) ABSTRACT

An energy absorption device for use in a steering column assembly in a motor vehicle includes a steering column bracket having a groove formed therein. A sheet strap is mounted on the groove in a hooked configuration and has a first end and a second end. An insert is mounted on the first end of the sheet strap. A pop rivet is mounted to the steering column bracket and extends across the groove to prevent the insert from moving. A pin is mounted on the second end of the sheet strap opposite the first end. The pin is adapted to be coupled to a fixed portion of the motor vehicle. The sheet strap unwinds during an impact event thereby absorbing energy.

8 Claims, 2 Drawing Sheets

ENERGY ABSORPTION SYSTEM FOR A STEERING COLUMN BRACKET

FIELD OF THE INVENTION

The present invention relates to a steering column bracket in a motor vehicle, and more particularly to an energy absorption system for a steering column bracket in a motor vehicle.

BACKGROUND OF THE INVENTION

Steering column brackets are known in the art and are generally used to support a lower mounting bracket that extends from the steering wheel of a motor vehicle to a steering assembly. The steering column bracket is mounted to the instrument panel of the motor vehicle. As the point of support for the steering assembly of the motor vehicle, steering column brackets must be able to absorb collision energy in the event of an impact.

Accordingly, steering column brackets typically include an energy absorption device mounted thereto that absorbs energy during an impact event. Because the energies involved during an impact event can be relatively high, a specially designed energy absorption device is provided.

SUMMARY OF THE INVENTION

An energy absorption device for use in a steering column assembly in a motor vehicle includes a steering column bracket having a groove formed therein. A sheet strap is mounted on the groove in a hooked configuration and has a first end and a second end. An insert is mounted on the first end of the sheet strap. A pop rivet is mounted to the steering column bracket and extends across the groove to prevent the insert from moving. A pin is mounted on the second end of the sheet strap opposite the first end. The pin is adapted to be coupled to a fixed portion of the motor vehicle. The sheet strap unwinds during an impact event thereby absorbing energy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
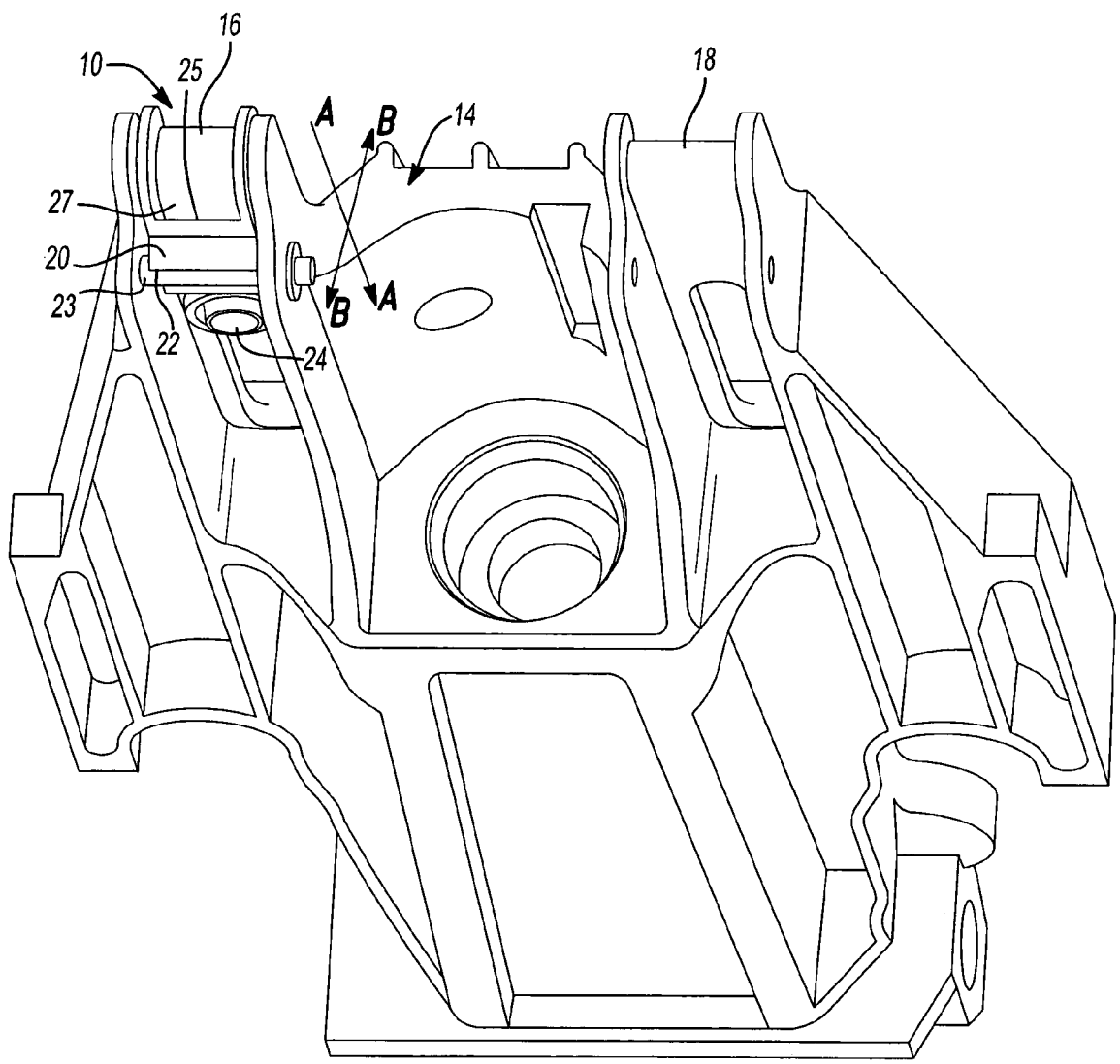
FIG. 1 is a perspective view of an exemplary steering column bracket and energy absorption device constructed according to the principles of the present invention.

With reference to FIG. 1, an energy absorption system 10 constructed according to the principles of the present invention is shown in operative association with a steering column bracket 14. It should be appreciated that various other steering column brackets may be used with the energy absorption system 10 without departing from the scope of the present invention.

The energy absorption system 10 generally includes a sheet strap 16 mounted on a groove 18 formed on the steering column bracket 14. Only one of two energy absorption systems 10 are shown on the steering column bracket 14 for purposes of clarity. The groove 18 extends in a first direction along a longitudinal axis of the steering column bracket 14, indicated by arrow A—A.

The sheet strap 16 has a hooked configuration that wraps around the end of the groove 18. The sheet strap 16 is preferably made of a metal and coated with a lubricating substance. For example, the sheet strap 16 may be made from steel and coated with Teflon, though various other materials may be employed. As will be described in greater detail below, the sheet strap 16 unwinds from its hooked configuration during an impact event by sliding along the groove 18, absorbing energy from the impact event as the sheet strap 16 unwinds.

Figure 2:
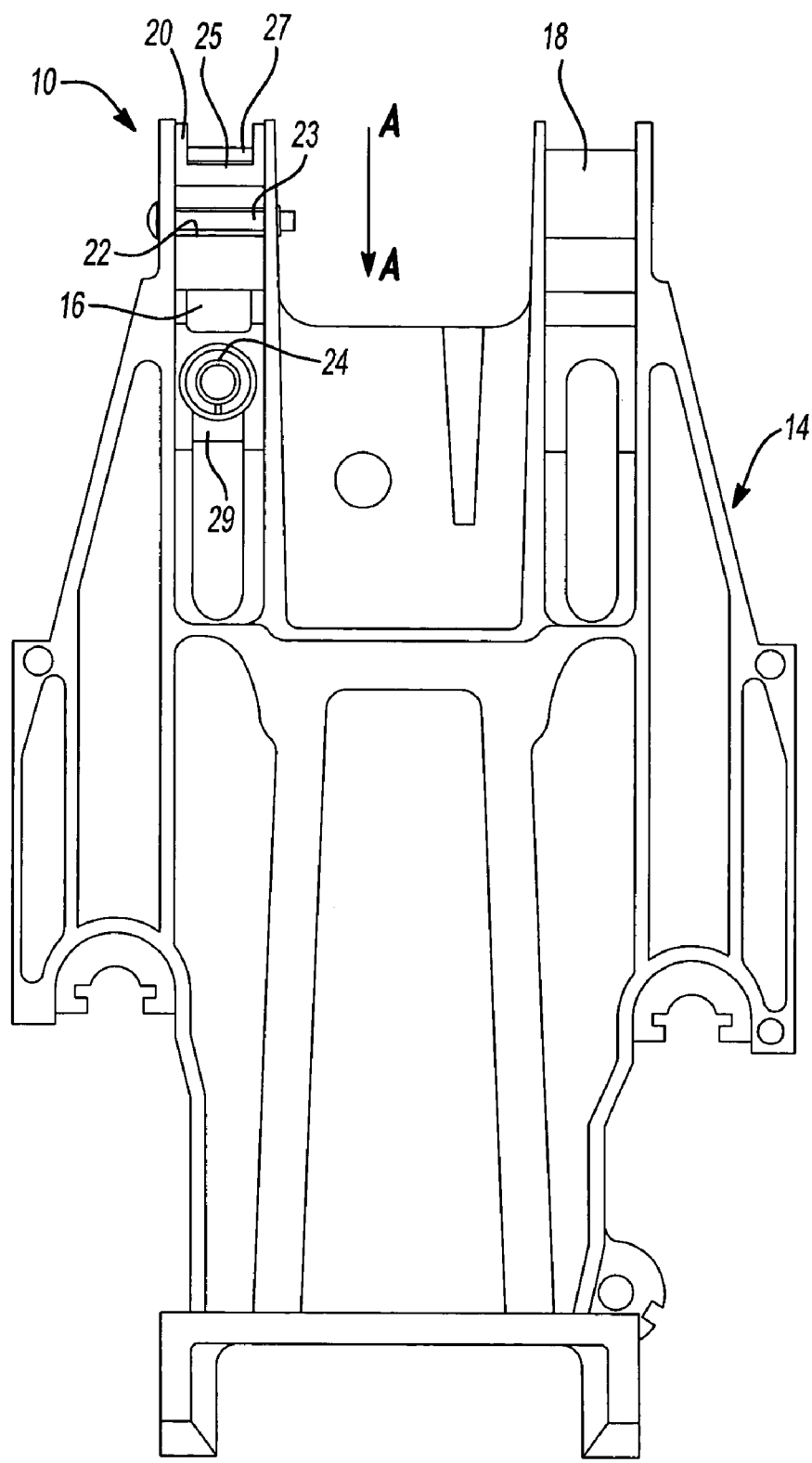
FIG. 2 is a bottom view of the steering column bracket and energy absorption device of FIG. 1.

The energy absorption system 10 further includes a plastic insert 20 mounted under the groove 18. The plastic insert 20 includes a slot 22 sized to receive a pop rivet 23. As best seen in FIG. 2, the pop rivet 23 extends across the groove 18 in the slot 22 of the plastic insert 20, thereby holding the plastic insert 20 into position at the end of the groove 18.

Returning to FIG. 1, the plastic insert 20 further includes an aperture 25 sized to receive a first end 27 of the sheet strap 16 therein. The first end 27 is allowed to move relative to the plastic insert 20 in a longitudinal direction relative to the steering column bracket 14 (e.g., in the direction of arrow A—A) as it unwinds during an impact event while simultaneously the plastic insert 20 and pop rivet 23 hold the first end 27 from moving in a vertical direction relative to the steering column bracket 14 (e.g., in the direction of arrow B—B). The plastic insert 20 is preferably coated with a lubricant to aid the sheet strap 16 in moving relative to the plastic insert 20, as will be described in greater detail below.

The sheet strap 16 is held by a screw attachment 24 or other type of pin within the groove 18 at a second end 29 opposite that of the first end 25. The screw attachment 24 connects the sheet strap 16 to an instrument panel (not shown) of a motor vehicle (not shown). Accordingly, the second end 29 is essentially coupled to the body of the motor vehicle and cannot move relative thereto.

During an impact event, the steering column bracket 14 moves relative to the instrument panel (not shown) and body (not shown) of the motor vehicle. However, the second end 29 of the sheet strap 16 is fixed by screw attachment 24 to the instrument panel and therefore does not move relative to the instrument panel (not shown). Accordingly, the screw attachment 24 and sheet strap 16 move relative to the steering column bracket 14 within the groove 18 as the steering column bracket 14 moves relative to the instrument panel and body of the motor vehicle. This in turn forces the sheet strap 16 to unwind as it is pinned at the first end 25 by the plastic insert 20 and the pop rivet 23 from moving in the direction of arrow B—B. As the sheet strap 16 unwinds, the sheet strap 16 absorbs energy from the impact event.

The sheer strength of the pop rivet 23 is approximately 5.56 kn and the tensile strength is approximately 4.67 kn. The pop rivet 23 is sufficiently strong to hold the sheet strap 16 in place when unwinding during an impact event. Moreover, prior to installation of the pop rivet 23, the groove 18 can be finished to a smooth surface prior to the assembly process so that the sheet strap 16 may slide therein during the impact event.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An energy absorption device for use in a steering column assembly in a motor vehicle, the energy absorption device comprising;
   a steering column bracket having a groove formed therein extending in a first direction;
   a sheet strap mounted within said groove in a hooked configuration and having a first end and a second end;
   an insert mounted on said first end of said sheet strap to prevent said sheet strap from moving in a direction other than said first direction;
   a rivet mounted to said steering column bracket and extending across said groove to prevent said insert from moving relative to said steering column bracket; and
   a pin mounted on said second end of said sheet strap opposite said first end, said pin adapted to be coupled to a fixed portion of the motor vehicle and capable of moving relative to said steering column bracket within said groove;
   wherein during an impact event said steering column bracket moves relative to said pin and said first end moves in said first direction such that said sheet strap unwinds from said hooked configuration thereby absorbing energy from said impact event.

2. The energy absorption system of claim 1, wherein said steering column bracket moves relative to the fixed portion of the motor vehicle during an impact event, thereby unwinding said sheet strap from said hooked configuration.

3. The energy absorption system of claim 1, wherein said insert includes a slot formed therein sized to receive said rivet.

4. The energy absorption system of claim 1, wherein said groove in said steering column bracket is finished to have a smooth surface.

5. The energy absorption system of claim 1, wherein laid sheet strap is made from a metal.

6. The energy absorption system of claim 1, wherein said insert includes an aperture formed therein sized to receive said first end of said sheet strap.

7. The energy absorption system of claim 6, wherein said sheet strap moves relative to said insert within said aperture when said sheet strap is unwinding during an impact event.

8. The energy absorption of claim 7, wherein said insert is lubricated to aid said sheet strap to move within said aperture.

* * * * *